9571X
H. W. PITTS.
Rotary Cultivator.
Patented Mar. 31, 1836.
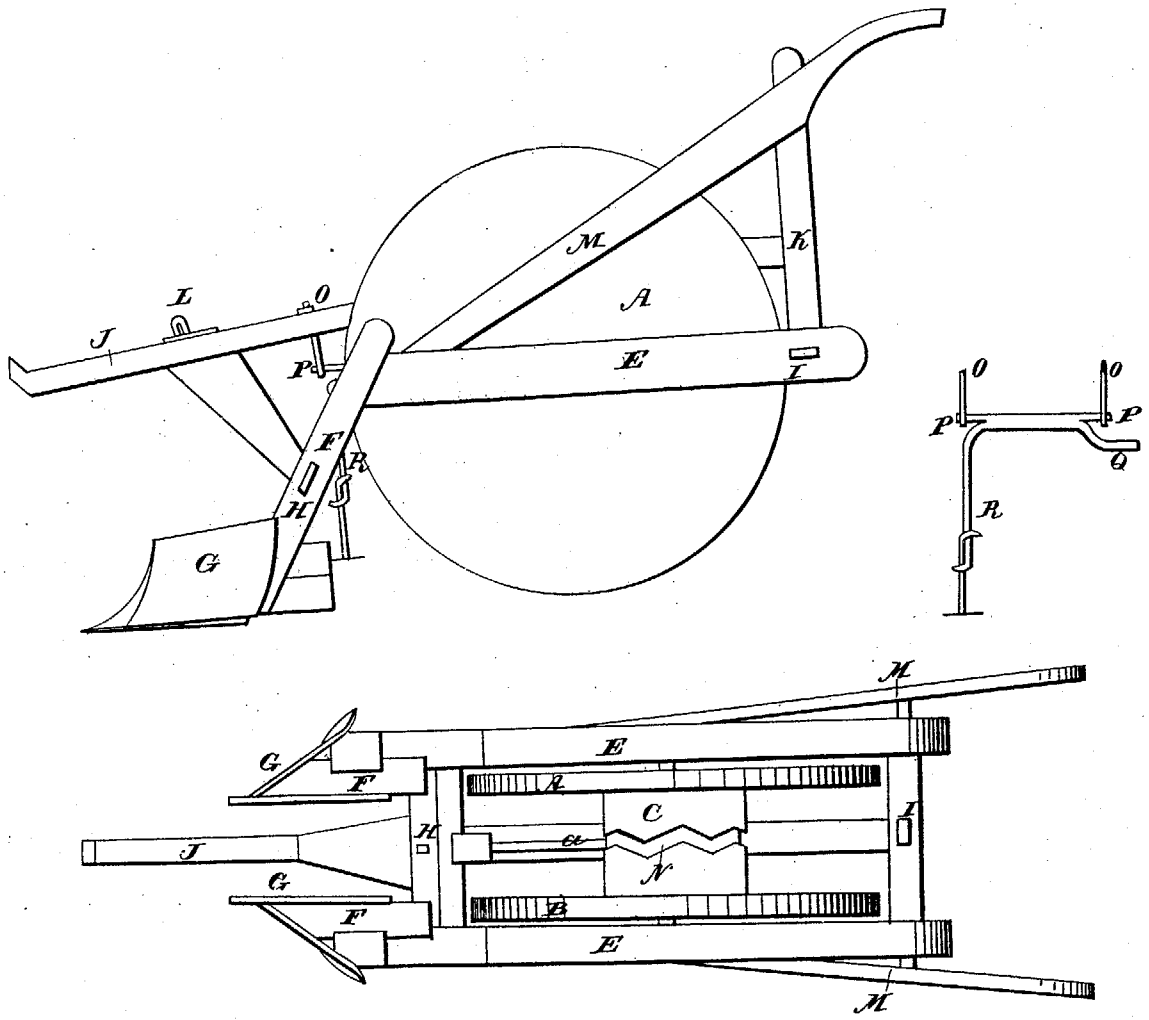
N. PETERS, PHOTO-LITHOGRAPHER, WASHINGTON, D. C.

9571X 3-31-1836

Harry W. Pitts Cotton Ploughing Machine
Letters Pattent

The Schedule referred to in these Letters Patent and making part of the same
containing a description in the words of the said Harry W Pitts himself of his
improvement in the machine for ploughing and thinning out Cotton

---

Be it known that I Harry W Pitts, of Wilsonville. County of Shelby, and State of
Alabama have made an improvement, being a machine for ploughing and thin
ning out Cotton, called Pitts Cotton Cultivator, which is described as follows.
reference being had to the annexed drawings of the same, making part of this spec
ification. This Machine is constructed in the following manner. Two wheels
A, B, two feet six inches in diameter are prepared & may be composed of plank three
fourths of an inch thick. These wheels are to be permanently attached to a hub
or circular solid piece of timber or iron C. ten inches in diameter & from seven
to ten inches long. An iron axle tree, D turned true at the ends is to pass through
the centre of the wheels and hub, and to project out from the wheels on either side
two inches. These wheels thus united are placed between a rectangular frame E.
the sides of which are composed of scantling two feet five inches long and two and a
half inches thick by three wide. One foot from the ends of these pieces, are the bear
ings of the axle tree. The axle runs into the frame an inch and a half so as to
leave a small space between the wheels and the frame. At the ends of these
pieces in which the axle is inserted are framed two foot pieces F, projecting for
ward at an angle of forty five degrees more or less, and extending to the ground
at the bottom of these pieces are attached ploughs G, one to each made as an
ordinary dagon plough with the cutting edges turned toward each other, and
so formed as to run on a line with the inside of each wheel, so that the wheels
will follow in the furrow they make. The two inclined foot pieces will be uni
ted together by a piece of timber H, the same size with themselves, a little below
where they join the side pieces so as to add to their strength and to keep them
a proper distance apart. A similar piece I will unite the side pieces in
which the axles run immediately behind the wheels. The beam J to which
the horse will be attached will be placed between the wheels and inserted to

9571 X    3-31-1836 an upright piece K, which itself is tenanted to the cross piece that unites the
hinder part of the frame. The beam may be of any convenient length say four
and an half or five feet long, and attached in front of the wheels to the cross piece
uniting the inclined foot pieces by means of an iron rod and screw L. The han-
dle M will be fastened to the side pieces and connected to a cross piece running
through the end of the beam. A zig zag groove N. will be formed around the
hub to which the wheels are attached about an inch wide & an inch deep
Two short iron bolts O. will be inserted through the beam, between the hub
and the ploughs, and fastened to it by screws and taps on top of the beam. These
bolts will have holes in the bottom of them, in which will be inserted the
end of a crank P, to be constructed after the following manner viz. the point
will work in the holes in the bolts & it will be so placed under the beam
that its end marked Q will fit into & be controlled by the zig zag groove in
the hub. This will give the point R a traverse motion. To the point R a
hoe with the helve inserted through the centre must be attached. It is plac-
ed horizontally) & formed so as to cut both ways & of any size that may be desir-
ed it will be attached by means of a screw (and bolt & made with a space in
the helve of the hoe so that it can be raised or lowered at pleasure. The horse may
walk on the ridge; or by putting) an arm and brace to the beam, or curving it
the horse may be made to walk on one side. By having one or more hoes
of different sizes, any quantity of the cotton required may be cut out. This
Machine may likewise be used for other purposes. For a further illustration
of my invention I refer to the model of the same deposited in the Patent
Office. What I claim as my invention and which I desire to secure by
Letters Patent consists in the machine for ploughing and thinning out Cot-
ton, called "Pitts Cotton Cultivator" as before described Witnesses
Sam Stettinius
Gilbert L. Giberson Harvey W. Pitts